J. P. ALLEN.
Cotton-Planter.
No. 25,616.
Patented Oct. 4, 1859.
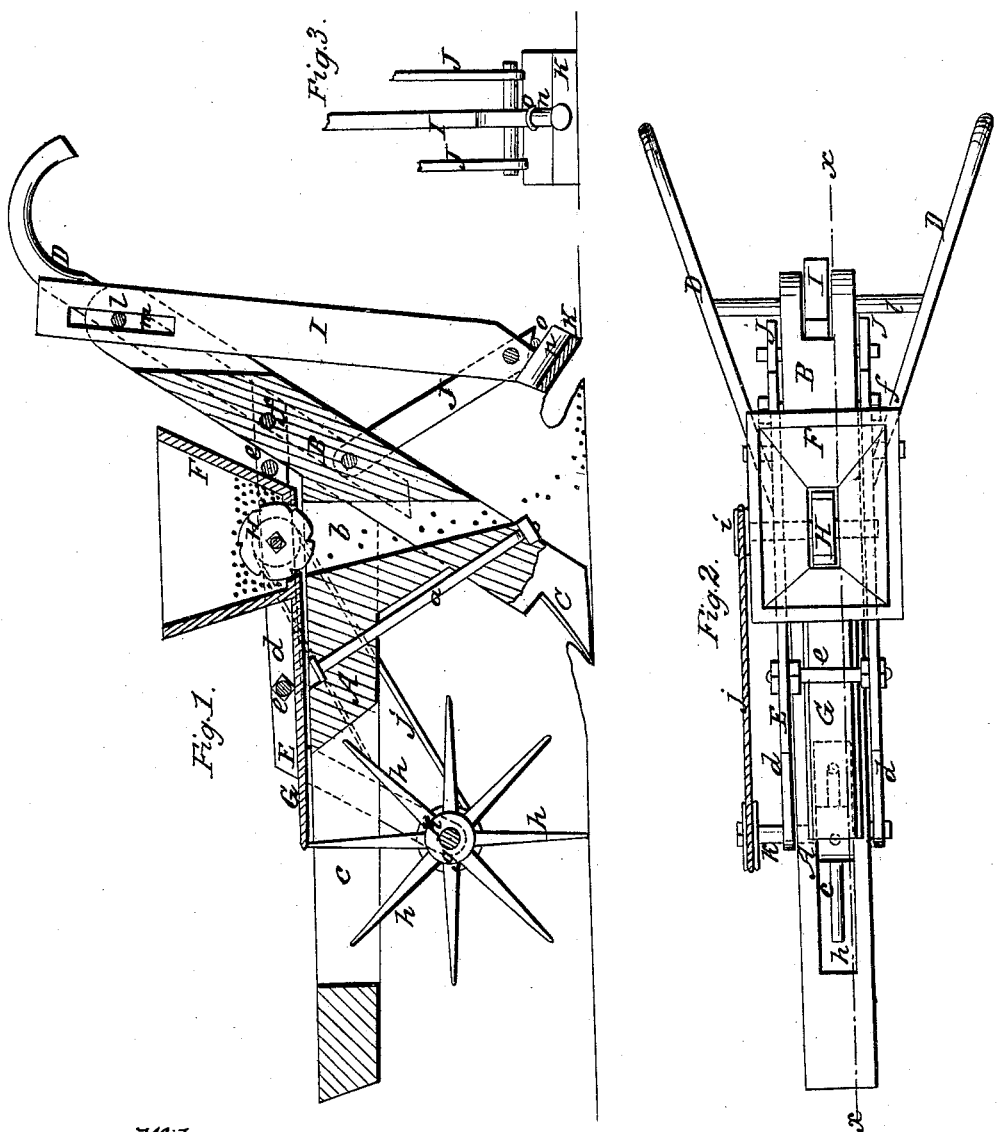
Witnesses.
John Adams.
Isaac B. Lewis.
Inventor.
John P. Allen.

UNITED STATES PATENT OFFICE.

JOHN P. ALLEN, OF MIDVILLE, GEORGIA.

IMPROVEMENT IN SEED-PLANTERS.

Specification forming part of Letters Patent No. 25,616, dated October 4, 1859.

*To all whom it may concern:*

Be it known that I, JOHN P. ALLEN, of Midville, in the county of Burke and State of Georgia, have invented a new and Improved Seeding-Machine; and I do hereby declare that the following is a full, clear, and exact description of the same, reference being had to the annexed drawings, making a part of this specification, in which—

Figure 1 is a side sectional view of my invention, taken in the line $x$ $x$, Fig. 2; Fig. 2, a plan or top view of same. Fig. 3 is a detached back view of the coverer.

Similar letters of reference indicate corresponding parts in the several figures.

This invention consists in a peculiar arrangement and combination of a coverer, hopper, and seed-distributing device, substantially as hereinafter described, whereby the hopper is effectually prevented from becoming choked or clogged, the machine allowed to work smoothly, and the seed perfectly covered, even when the machine is inclined or canted to either side and the ground under cultivation rough or uneven.

To enable those skilled in the art to fully understand and construct my invention, I will proceed to describe it.

A represents the beam, to the back end of which an inclined bar, B, is attached, having a furrow-share, C, at its lower end. The bar B is braced by a rod, $a$, as shown clearly in Fig. 1. The bar B has a handle, D, attached to each side of it, as shown clearly in Fig. 2. The beam A is slotted vertically in two places, as shown at $b$ $c$, the slot $b$ extending through the inclined bar B and forming a seed-passage, by which the seed is conveyed to the furrow just behind the share C.

E is a frame, which is formed of two metal bars, $d$ $d$, connected by traverse-rods $e$. This frame E is attached at its back end by a fulcrum-bolt, $f$, to the inclined bar B, the frame being allowed to work freely on said bolt. The front part of frame E extends down below the beam A, and a hub, $g$, is fitted therein, said hub being provided with radial spokes or arms $h$, which, as they rotate with the hub $g$, pass through the slot $c$.

In the frame E, and directly over the slot $b$ in the beam A, a hopper, F, is secured. This hopper has a bar, G, attached to it, which bar passes over the arms $h$. Within the hopper F a wheel, H, is placed, said wheel having its periphery notched, as shown clearly in Fig. 1. The axis of the wheel H extends through the frame E at one side, and a pulley, $i$, is placed on it, said pulley having a belt, $j$, passing around it, which belt also passes around a pulley, $k$, on the axis of hub $g$.

I is a bar, the upper part of which is fitted on a rod, $l$, said rod passing through a longitudinal slot, $m$, in the bar. The lower end of the bar I is connected to two swinging arms, J J, attached to the inclined bar B. The lower end of the bar I terminates in a pintle, $n$, which has an oblique position relatively with the bar, as shown clearly in Fig. 1. To this pintle a plate or bar, K, is secured by a staple or strap, $o$, the pintle being fitted in a groove in the plate or bar. The plate or bar K is allowed to turn or incline itself on the pintle $n$, and the bar I allows said plate or bar to rise and fall. It will be seen, also, that the frame E is allowed to rise and fall independently of the bar I. As the implement is drawn along the spokes or arms $h$ rotate in consequence of their contact with the earth, and a rotary motion is given the wheel H in the hopper F by the belt $j$. The arms $h$ strike the bar G and give a vibratory motion to the hopper, effectually preventing its clogging, the wheel H, as it rotates, distributing the seed in the usual way. The seed is covered by the plate or bar K, which, on account of its attachment to the bar I and the manner in which the latter is connected to the machine, as shown, is allowed to readily pass over clods and obstructions, and at the same time the machine may be inclined, when necessary, without affecting the proper position of said plate or bar.

The device, as a whole, is allowed to work smoothly, and is well adapted for planting cotton as well as other seed.

I do not claim separately any of the parts herein shown and described; but

I do claim as new and desire to secure by Letters Patent—

The arrangement and combination of the frame E, provided with the armed hub $g$, the hopper F and its bar G, in connection with the adjustable bar I, provided with the self-adjusting covering plate or bar K, substantially as and for the purpose set forth.

JOHN P. ALLEN.

Witnesses:
 JOHN ADAMS,
 ISAAC B. LEWIS.